United States Patent
Kanazawa

(10) Patent No.: US 12,548,211 B2
(45) Date of Patent: Feb. 10, 2026

(54) IMAGE COLORIZATION USING MACHINE LEARNING

(71) Applicant: Google LLC, Mountain View, CA (US)

(72) Inventor: Nori Kanazawa, Mountain View, CA (US)

(73) Assignee: Google LLC, Mountain View, CA (US)

( * ) Notice: Subject to any disclaimer, the term of this patent is extended or adjusted under 35 U.S.C. 154(b) by 810 days.

(21) Appl. No.: 17/635,917

(22) PCT Filed: Sep. 11, 2019

(86) PCT No.: PCT/US2019/050527
§ 371 (c)(1),
(2) Date: Feb. 16, 2022

(87) PCT Pub. No.: WO2021/050055
PCT Pub. Date: Mar. 18, 2021

(65) Prior Publication Data
US 2022/0301227 A1 Sep. 22, 2022

(51) Int. Cl.
*G06T 11/00* (2006.01)
*G06T 7/194* (2017.01)
(Continued)

(52) U.S. Cl.
CPC .......... *G06T 11/001* (2013.01); *G06T 7/194* (2017.01); *G06T 7/90* (2017.01); *G06V 10/82* (2022.01);
(Continued)

(58) Field of Classification Search
CPC . G06T 11/00; G06T 7/194; G06T 7/90; G06T 2207/10024; G06T 2207/20081;
(Continued)

(56) References Cited

U.S. PATENT DOCUMENTS 10,091,479 B2 10/2018 Barron et al.
10,140,544 B1 11/2018 Zhao
(Continued)

FOREIGN PATENT DOCUMENTS

| CN | 107403200 | 11/2017 |
|---|---|---|
| CN | 108830912 | 11/2018 |

(Continued)

OTHER PUBLICATIONS

"First Examination Report in IN Application No. 202147058311", Jun. 14, 2022, 6 Pages.
(Continued)

*Primary Examiner* — Gabriel I Garcia
(74) *Attorney, Agent, or Firm* — IP Spring

(57) ABSTRACT

Implementations described herein relate to methods, systems, and computer-readable media to train and use a machine-learning model to colorize a grayscale image that depicts a person. In some implementations, a computer-implemented method includes receiving the grayscale image. The method further includes generating a colorized image based on the grayscale image as output of a trained convolutional neural network (CNN) by providing the grayscale image as input to the trained CNN. In some implementations, the trained CNN performs part segmentation to detect one or more parts of the person and colorizes the grayscale image.

6 Claims, 7 Drawing Sheets

(51) Int. Cl.
*G06T 7/90* (2017.01)
*G06V 10/82* (2022.01)
*G06V 40/10* (2022.01)

(52) U.S. Cl.
CPC .... *G06V 40/10* (2022.01); *G06T 2207/10024* (2013.01); *G06T 2207/20081* (2013.01); *G06T 2207/20084* (2013.01)

(58) Field of Classification Search
CPC .......... G06T 2207/20084; G06V 40/10; G06V 10/82
USPC .......................................................... 382/162
See application file for complete search history.

(56) References Cited

U.S. PATENT DOCUMENTS

| | | | | |
|---|---|---|---|---|
| 10,997,752 | B1* | 5/2021 | Yoo | G06T 11/00 |
| 11,334,873 | B2* | 5/2022 | Bennett | G06Q 40/02 |
| 11,451,758 | B1* | 9/2022 | Chaurasia | H04N 13/344 |
| 2019/0180136 | A1 | 6/2019 | Bousmalis et al. | |
| 2020/0273177 | A1* | 8/2020 | Chen | G06V 20/653 |
| 2021/0201071 | A1* | 7/2021 | Liao | G06T 11/001 |
| 2021/0366087 | A1* | 11/2021 | Du | G06V 10/764 |

FOREIGN PATENT DOCUMENTS

| | | |
|---|---|---|
| CN | 108921932 | 11/2018 |
| CN | 109376661 | 2/2019 |
| CN | 109949353 | 6/2019 |
| JP | 2012043151 | 3/2012 |
| JP | 2019117558 | 7/2019 |
| WO | 2018109505 | 6/2018 |
| WO | 2018213829 | 11/2018 |

OTHER PUBLICATIONS

"Japanese Office Action mailed Mar. 14, 2023 in JP Application No. 2021-575418", Mar. 14, 2023.
Atsushi Mori, et al., "Automatic colorization of near-infrared monochrome face image based on pixel-wise classification and regression,", The Institute of Electronics, Information and Communication Engineers (IEICE) Technical Report, Jan. 16, 2023, vol. 112, No. 386, pp. 353-358.
"Communication pursuant to Article 94(3) EPC in EP Application No. 19773675.4", Feb. 16, 2023, 7 pages.
Hyunsu Kim, et al., "Tag2Pix: Line Art Colorization Using Text Tag With SECat and Changing Loss", arxiv.org, Cornell University Library, 201 Olin Library Cornell University Ithaca, NY 14853, Aug. 16, 2019, 19 Pages.
"International Preliminary Report of Patentability in PCT/US19/050527", Mar. 24, 2022, 10 Pages.
"Japanese Office Action mailed Aug. 8, 2023 in JP Application No. 2021-575418", 15 Pages.
"Communication pursuant to Article 94(3) EPC in EP Application No. 19 773 675.4", May 8, 2024, 6 Pages.
"Decision for Rejection in Japanese Application No. 2021-575418", Nov. 21, 2023, 16 Pages.
"Korean Office Action in KR Application No. 10-2021-7041492", Nov. 27, 2023, 74 Pages.
"Chinese Office Action in CN Application No. 201980097497.4", Aug. 12, 2024, 20 pages.
"ColouriseSG—Colourise your black and white photos", Accessed on Sep. 4, 2019. https://colourise.sg/, 1 page.
"GitHub—jantic/DeOldify: A Deep Learning based project for colorizing and restoring old images (and video!)", GitHub, accessed on Sep. 4, 2019, https://github.com/jantic/DeOldify, 13 pages.
"International Search Report and Written Opinion in International Application No. PCT/US2019/050527", May 12, 2020, 13 Pages.
Aditya Deshpande, et al., "Learning Diverse Image Colorization", The IEEE Conference on Computer Vision and Pattern Recognition (CVPR), Apr. 27, 2017, 12 pages.
Bansal, et al., "Understanding and implementing cyclegan in tensorflow", 2017, 29 pages.
Fang Ming, et al., "A Method for Coloring Lo-Resolution Black and White Old Movies through Object Understanding", 2019 Chinese Control and Decision Conference (CCDC), IEEE, Jun. 4, 2019, pp. 5944-5949.
Fangting Xia, et al., "Joint Multi-Person Pose Estimation and Semantic Part Segmentation", The IEEE Conference on Computer Vision and Pattern Recognition (CVPR),, 2017, 10 pages.
Guadarrama, et al., "PixColor: Pixel Recursive Colorization", arXiv:1705.07208v2 [cs.CV], Jun. 5, 2017, 17 pages.
Jeff Hwang, et al., "Image Colorization with Deep Convolutional Neural Networks", Stanford University, Tech. Rep.., 2016, 7 pages.
Jiaojiao Zhao, et al., "Pixel-level Semantics Guided Image Colorization", arXiv:1808.01597v1 [cs.CV], Aug. 5, 2018, 12 pages.
Jun-Yan Zhu, et al., "Unpaired Image-to-Image Translation using Cycle-Consistent Adversarial Networks", The IEEE International Conference on Computer Vision (ICCV), Nov. 15, 2018, 18 pages.
Kamyar Nazeri, et al., "Image Colorization using Generative Adversarial Networks", International Conference on Articulated Motion and Deformable Objects, May 16, 2018, 11 pages.
Marcelo Rovai, "Colorizing Old B&W Photos and Videos With the Help of AI", Towards Data Science, University of California, Accessed on Sep. 4, 2019. https://towardsdatascience.com/colorizing-old-b-w-photos-and-videos-with-the-help-of-ai-76ba086f15ec, 20 Pages.
Mingming He, et al., "Deep Exemplar-based Colorization", ACM Transactions on Graphics (TOG), vol. 37. Issue 4, Article No. 47, Jul. 21, 2018, 15 pages.
Papandreou, et al., "Towards Accurate Multi-person Pose Estimation in the Wild", The IEEE Conference on Computer Vision and Pattern Recognition (CVPR), Apr. 14, 2017, 9 pages.
Phillip Isola, et al., "Image-to-Image Translation with Conditional Adversarial Networks", The IEEE Conference on Computer Vision and Pattern Recognition (CVPR), Nov. 26, 2018, 17 pages.
Qiwen Fu, et al., "Colorization Using ConvNet and GAN", Stanford University, 2017, 8 pages.
R. Irony, et al., "Colorization by Example", Eurographics Symposium on Rendering, The Eurographics Association, 2005, 10 pages.
Richard Zhang, et al., "Colorful Image Colorization", European Conference on Computer Vision, Sep. 17, 2016, 17 pages.
Richard Zhang, et al., "Real-Time User-Guided Image Colorization with Learned Deep Priors", arXiv:1705.02999v1 [cs.CV], May 8, 2017, 11 pages.
Satoshi Iizuka, et al., "Let there be Color!: Joint End-to-end Learning of Global and Local Image Priors for Automatic Image Colorization with Simultaneous Classification", ACM Transactions on Graphics (TOG), vol. 35, Issue 4, Article No. 110, Jul. 2016, 11 pages.
Zezhou Cheng, et al., "Deep Colorization", The IEEE International Conference on Computer Vision (ICCV), Apr. 30, 2016, 12 pages.
"Korean Office Action in Application No. 10-2021-7041492", Mar. 26, 2025.
"Notice of Grant in CN Application No. 201980097497.4", Feb. 14, 2025, 6 pages.
Patricia L. Suarez, et al., "Infrared Image Colorization based on a Triplet DCGAN Architecture", Proceedings of the IEEE Conference on Computer Vision and Pattern Recognition Workshops. 2017, 6 pages.

* cited by examiner

IMAGE COLORIZATION USING MACHINE LEARNING

RELATED APPLICATIONS

This application is a § 371 national stage of PCT International Application No. PCT/US19/50527, filed Sep. 11, 2019, entitled, "Image Colorization Using Machine Learning", which is incorporated herein by reference in its entirety.

BACKGROUND

Since cameras first became available, users have captured photographs to preserve memories. The captured photographs in the early years of photography were black and white images, e.g., due to the limitations of camera technology, due to the high cost of capturing a color photograph, etc. Subsequently, as color photography became available and cheaper, users captured and stored color photographs.

Modern image applications allow users to store, view, and edit photographs. Many users have scanned copies of old black and white photographs in their libraries along with more recently captured color photographs. Users may enjoy old black and white photographs if they were rendered as color photographs While image colorization techniques, including machine learning based techniques, can be used to colorize black and white images, it is difficult to get a good output color image when applying such techniques to old black and white photographs, especially photographs that depict one or more persons. For example, errors such as skin regions getting inconsistent skin tone color; one skin region, e.g., face getting color, while another region, e.g., hands not getting color; etc. can make the colorized photograph unsatisfactory.

Further, current image colorization techniques do not take into account the fact that persons depicted in old black and white photographs often wore different clothing styles from those in newer color photographs. Current image colorization techniques fail to account for such differences when adding colors to black and white photographs that depict one or more persons. This is a domain adaptation problem.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media to train and use a machine-learning model to colorize a grayscale image that depicts one or more persons.

In some implementations, a computer-implemented method includes receiving a grayscale image that includes a person. The method further includes generating a colorized image based on the grayscale image as output of a trained convolutional neural network (CNN) by providing the grayscale image as input to the trained CNN. In some implementations, the trained CNN performs part segmentation to detect one or more parts of the person and colorizes the grayscale image.

In some implementations, generating the colorized image includes obtaining an intermediate colorized image as output of a latent layer of the trained CNN, obtaining a network output image as output of an output layer of the trained CNN, and combining the intermediate colorized image and the network output image to obtain the colorized image. In some implementations, the intermediate colorized image has a lower resolution than the network output image. In these implementations, the method can further include upsampling the intermediate colorized image to a same resolution as the network output image prior to the combining.

In some implementations, the method can further include downsampling the grayscale image prior to providing the grayscale image as input to the trained CNN.

In some implementations, the colorized image has a lower resolution than the grayscale image. In these implementations, the method can further include upsampling the colorized image to a same resolution as the grayscale image and combining the colorized image with the grayscale image to obtain an output image. In some implementations, the colorized image can be an sRGB image.

In some implementations, a computer-implemented method to train a convolutional neural network to colorize grayscale images includes providing training data comprising a plurality of training color images that each depict one or more persons, corresponding grayscale training images, and part annotations for the one or more persons in each training color image. The method further includes, for each grayscale training image, obtaining, as output of the convolutional neural network, an output feature vector that is descriptive of a colorized image based on the grayscale training image and part annotations for the one or more persons in the grayscale training image. The method further includes, for each grayscale training image, obtaining a perceptual loss value from a pixel discriminator based on a label prediction of whether the colorized image is an original color image or a predicted color image. The method further includes, for each grayscale training image, modifying a parameter of the convolutional neural network based on the perceptual loss value.

In some implementations, the method to train the convolutional neural network can further include, for each grayscale training image, obtaining, from a latent layer of the convolutional neural network, an intermediate feature vector that is descriptive of an intermediate colorized image based on the grayscale training image and intermediate part annotations for the one or more persons in the grayscale training image. The method can further include, for each grayscale training image, obtaining a feature loss value from a feature discriminator based on a prediction, by the feature discriminator, of whether a groundtruth color image exists that corresponds to the intermediate colorized image. In these implementations, the intermediate feature vector is provided as input to the feature discriminator. The method can further include modifying the parameter of the convolutional neural network is further based on the feature loss value. In some implementations, the method can further include resizing the intermediate colorized image, obtaining, from an output layer of the convolutional neural network, a network output image, and combining the intermediate colorized image and the network output image to obtain the colorized image.

In some implementations, the method to train the convolutional neural network can further include, for each grayscale training image, obtaining a saturation loss from a saturation enhancer. In these implementations, modifying the parameter of the convolutional neural network is further based on the saturation loss. In some implementations, obtaining the saturation loss can include identifying one or more background areas of the colorized image based on the part annotations and for pixels identified as being in the background areas, calculating the saturation loss based on a saturation of the colorized image and a brightness value of the colorized image.

In some implementations, the method to train the convolutional neural network can further include, for each grayscale training image, obtaining a skin tone loss from a skin tone enhancer. In these implementations, modifying the parameter of the convolutional neural network is further based on the skin tone loss. In some implementations, obtaining the skin tone loss can include identifying one or more silhouettes in the colorized image based on the part annotations and calculating the skin tone loss for each pixel of the colorized image based on a hue of the colorized image and whether the pixel is in at least one of the one or more silhouettes in the colorized image.

In some implementations, a system includes one or more processors that implement a convolutional neural network having a plurality of layers. The convolutional neural network is configured to perform operations that include receiving a grayscale image that depicts one or more persons and generating a colorized image based on the grayscale image. The colorized image includes part annotations for the one or more persons in the grayscale image. The one or more processors further implement a pixel discriminator. The pixel discriminator is configured to perform operations that include receiving the colorized image and generating a label prediction that indicates whether the colorized image is an original color image or a predicted color image.

In some implementations, the convolutional neural network is configured to perform further operations that can include generating, at a latent layer of the convolutional neural network, an intermediate colorized image based on the grayscale image. The intermediate colorized image includes intermediate part annotations for the one or more persons in the grayscale image. In these implementations, the one or more processors further implement include a pixel discriminator. The pixel discriminator is configured to perform operations that include receiving the intermediate colorized image and generating a prediction that indicates whether a groundtruth color image exists that corresponds to the grayscale image.

In some implementations, the intermediate colorized image has a lower resolution than a resolution of the grayscale image. In these implementations generating the colorized image can further include resizing the intermediate colorized image to the resolution of the grayscale image and after the resizing, combining the intermediate colorized image and a network output image of an output layer of the convolutional neural network to obtain the colorized image.

In some implementations, the prediction of the feature discriminator can be used to train the convolutional neural network by adjusting one or more parameters of the convolutional neural network.

In some implementations, the pixel discriminator can be trained by providing as input a plurality of groundtruth color images with associated groundtruth labels that indicate that the images are groundtruth color images, and adjusting one or more parameters of the pixel discriminator using a loss that is based on a difference between the label prediction for each input image and the groundtruth labels.

In some implementations, the pixel discriminator can be trained based on a loss that compares the label prediction with a groundtruth label that indicates whether the colorized image is the original color image or the predicted color image.

In some implementations, the label prediction of the pixel discriminator can be used to train the convolutional neural network by adjusting one or more parameters of the convolutional neural network.

DETAILED DESCRIPTION

The implementations described herein can generate color images from a grayscale image using a trained machine learning model. The machine learning model may be trained to perform part segmentation to detect one or more parts of a person depicted in a grayscale image and to colorize the grayscale image.

Some implementations described herein relate to a generative adversarial network (GAN) configuration that can be used to train a generative model that can perform part segmentation and image colorization. The GAN configuration may include a generative model, e.g., a convolutional neural network, and two adversarial models. In some implementations, the generative model may be trained to generate colorized images from grayscale images. A first adversarial model may be trained to determine whether a colorized image is an image for which a groundtruth color image exists or not. In some implementations, the first adversarial model may receive an intermediate colorized image generated at a latent layer of a generative model implemented using a convolutional neural network. In some implementations, a second adversarial model may be trained to determine whether a colorized image is a groundtruth colorized image or an image generated as an output of a generative model, e.g., from the output layer of a convolutional neural network.

In some implementations, loss values generated by the first adversarial model and the second adversarial model are provided as training inputs to the generative model. In some implementations, additional loss values may be obtained based on heuristics related to image saturation (e.g., of background areas in the image) and skin tone (e.g., for one or more persons depicted in the image) and may be used to train the generative model.

Some implementations described herein relate to a generative machine learning model that is trained and can generate a color image from an input grayscale image. The machine learning model may be trained to perform part segmentation to annotate one or more parts of a person depicted in the input image and to colorize the input image. In some implementations, the machine learning model is implemented using a convolutional neural network (CNN). In some implementations, the color image is obtained by combining an intermediate colorized image obtained from a latent layer of the CNN with a network output image obtained from an output layer of the CNN.

Figure 1:
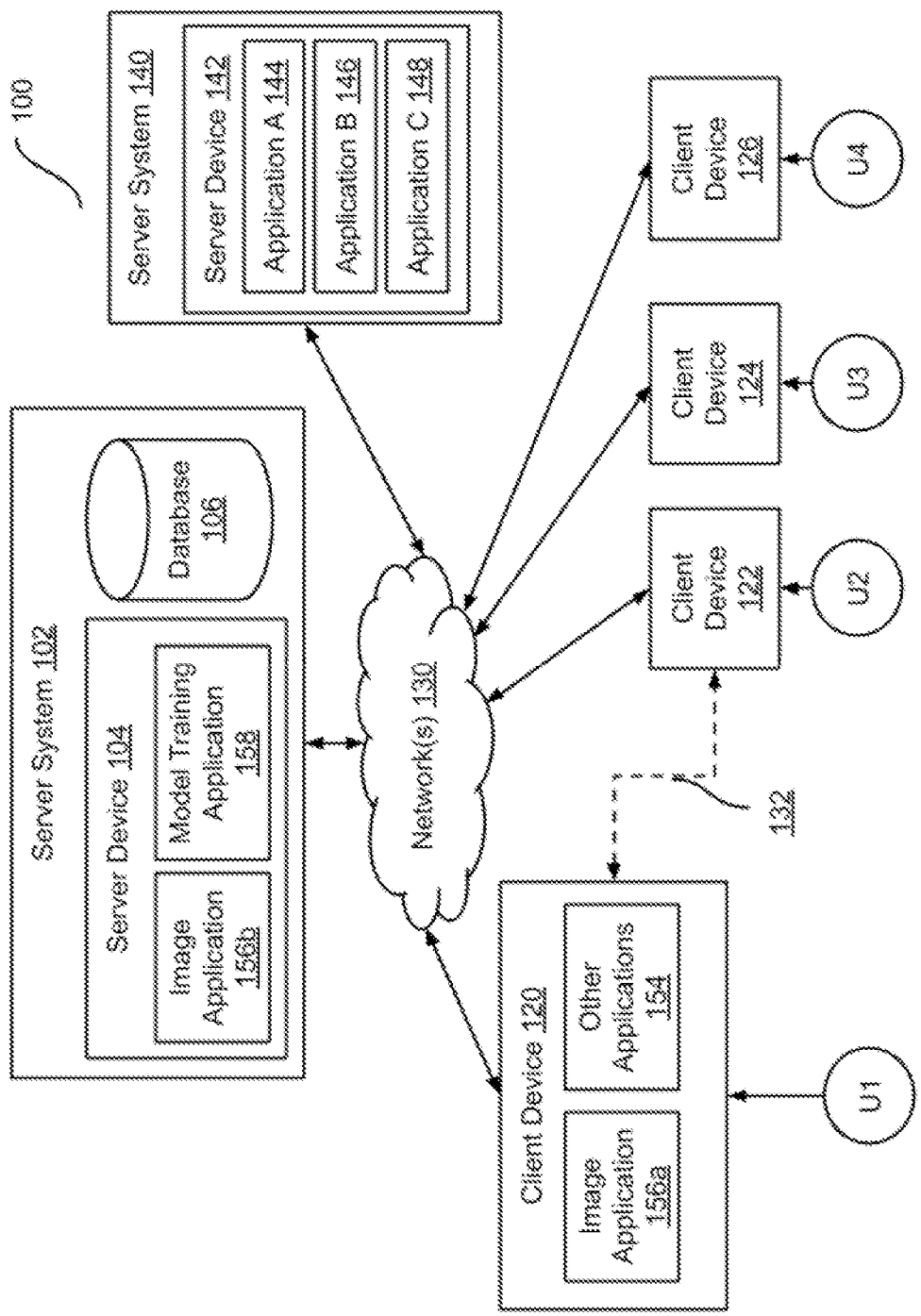
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 and second server system 140 in the example of FIG. 1. Server systems 102 and 140 can communicate with a network 130, for example. Server system 102 can include a server device 104 and a database 106 or other storage device. In some implementations, server device 104 may provide an image application 156b and/or a training application 158. Second server system 140 can include a second server device 142, configured to provide one or more applications, e.g., application A 144, application B 146, and application C 148. In FIG. 1 and the remaining figures, a letter after a reference number, e.g., "156a," represents a reference to the element having that particular reference number. A reference number in the text without a following letter, e.g., "156," represents a general reference to embodiments of the element bearing that reference number.

Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, second server system 140, and second server device 142, and shows four blocks for client devices 120, 122, 124, and 126. Server blocks 102, 104, 106, 140, and 142 may represent multiple systems, server devices, and network databases, and the blocks can be provided in different configurations than shown. For example, server system 102 and/or second server system 140 can represent multiple server systems that can communicate with other server systems via the network 130. In some implementations, server system 102 and/or second server system 140 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 or second server system 140, and/or via a network service, e.g., a social network service or other type of network service, implemented on server system 102 or second server system 140. For example, respective client devices 120, 122, 124, and 126 may communicate data to and from one or more server systems (e.g., system 102, second server system 140).

In some implementations, the server system 102 and/or second server system 140 may provide appropriate data to the client devices such that each client device can receive communicated content or shared content uploaded to the server system 102 or second server system 140 and/or network service. In some examples, users U1-U4 can interact via audio or video conferencing, audio, video, or text chat, or other communication modes or applications.

A network service implemented by server system 102 or second server system 140 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide image application 156a and one or more other applications 154. Client devices 122-126 may also provide similar applications. Image application 156a may be implemented using hardware and/or software of client device 120. In different implementations, image application 156a may be a standalone client application, e.g., executed on any of client devices 120-124, or may work in conjunction with image application 156b provided on server system 102. Image application 156a and image application 156b may provide various functions related to images. For example, such functions may include one or more of capturing images using a camera, analyzing images to associate one or more tags, modifying images, scanning images, colorizing grayscale images, etc.

In some implementations, image application 156 may include a trained machine learning model. For example, the trained machine learning model, also referred as colorizer, may be trained to colorize grayscale images. In some implementations, server device 104 may also include a model training application 158. In some implementations, image application 156 and/or model training application 158 may perform training of the colorizer. In some implementations, training may be performed using one or more additional machine learning models, e.g., discriminators.

For example, the colorizer and the one or more discriminators may be arranged in a generative adversarial network configuration for training.

In some implementations, client device 120 (or any of other client devices 122-126) may include a colorizer (e.g., a machine learning model trained to colorize grayscale images) as part of image application 156a and/or other applications 154. In some implementations, client device 120 (or any of other client devices 122-126) may also include other machine learning models (e.g., discriminators) and training instructions. In some implementations, client devices 120-126 may receive a trained model from server device 104, and may not include training instructions and the other machine learning models.

In some implementations, training instructions and discriminators may be provided as a separate application, e.g., model training application 158, that executes on server device 104. In these implementations, server device 106 may execute training instructions to obtain a generative adversarial network configuration that includes the colorizer and one or more discriminators and to perform training. Upon completion of the training, model training application 158 may provide a trained colorizer for use in image application 156.

In some implementations, client device 120 may include one or more other applications 154. For example, other applications 154 may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of other applications 154 may be standalone applications that execute on client device 120. In some implementations, one or more of other applications 154 may access a server system, e.g., server system 102 and/or second server system 140, that provides data and/or functionality of other applications 154. For example, any of applications 144, 146, and 148, shown as being provided by second server system 140 may provide data and/or commands to one or more of other applications 154. In some implementations, server applications 144-148 may be standalone applications that are accessed by a client device, e.g., via a web-browser, or other client-side program.

A user interface on a client device 120, 122, 124, and/or 126 can enable the display of user content and other content, including images, video, data, and other content as well as communications, privacy settings, notifications, and other data. Such a user interface can be displayed using software on the client device, software on the server device, and/or a combination of client software and server software executing on server device 104 and/or second server device 142, e.g., application software or client software in communication with server system 102 and/or second server device 142. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemographs where a portion of the image includes motion while other portions are static, etc.), or a video (e.g., a sequence of images or image frames that may include audio). While the remainder of this document refers to an image as a static image, it may be understood that the techniques described herein are applicable for dynamic images, video, etc. For example, implementations described herein can be used with still images (e.g., a photograph, or other image), videos, or dynamic images.

Figure 2:
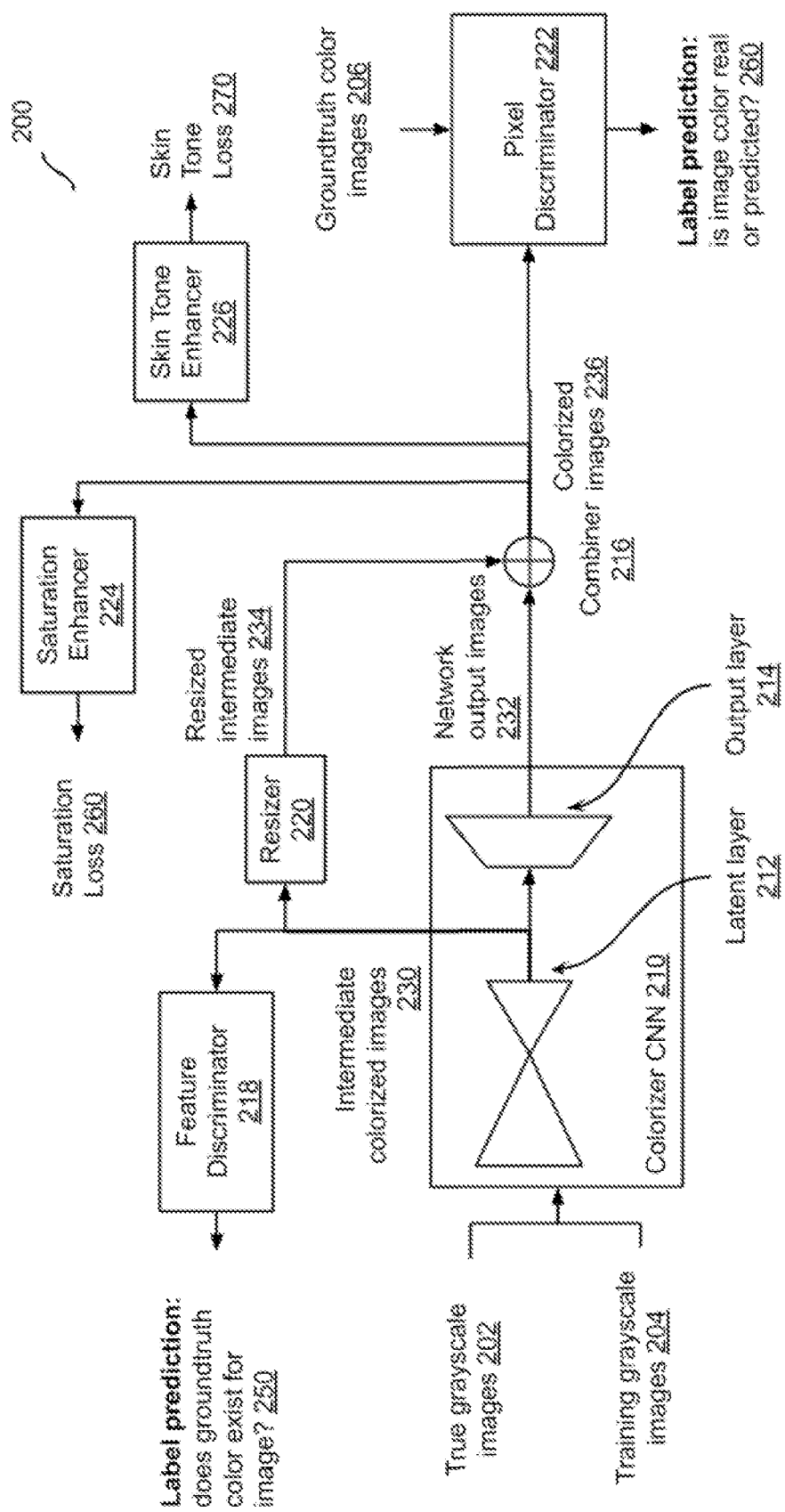
FIG. 2 is a block diagram illustrating an example generative adversarial network (GAN) configuration 200 to train a machine learning model to colorize images.

FIG. 2 is a block diagram illustrating an example generative adversarial network (GAN) configuration 200 to train a machine learning model to colorize images. The GAN configuration can be implemented on a computer that includes one or more processors and memory with software instructions. In some implementations, the one or more processors may include one or more of a general-purpose central processing unit (CPU), a graphics processing unit (GPU), a machine-learning processor, e.g., a TensorFlow Processing Unit (TPU) or other processor), an application-specific integrated circuit (ASIC), a field-programmable gate array (FPGA), or any other type of processor.

GAN configuration 200 may include a plurality of machine learning models. In some implementations, GAN configuration 200 may include a colorizer convolutional neural network (CNN) 210, a combiner 216, a feature discriminator 218, a resizer 220, and a pixel discriminator 222. In some implementations, GAN configuration 200 may further include a saturation enhancer 224 and/or a skin tone enhancer 226.

As illustrated in FIG. 2, grayscale images, including true grayscale images 202 and training grayscale images 204 are provided as inputs to colorizer CNN 210. True grayscale images 202 may be images for which no color data is available. For example, such images may include old photographs, e.g., captured using black and white film, or other black and white images. Training grayscale images 204 may include images that have been modified to remove color information. For example, training grayscale images 204 may be obtained by removing color information from groundtruth color images 206. For example, groundtruth color images may include color photographs, e.g., captured using color film, a digital color camera, or other image capture techniques that record color information. Groundtruth color images may have associated groundtruth labels that indicate that the images are groundtruth color images (not colorized).

In some implementations, colorizer CNN 210 may be a ladder network or a U-Net model. In some implementations, colorizer CNN 210 may be a fully-convolutional CNN model, e.g., an auto-encoder plus skip connections. Colorizer CNN 210 may be organized into a plurality of layers. Each layer may comprise a plurality of neural network nodes. In some implementations, each layer may include three convolution nodes (residual convolutional nodes). In some implementations, one or more nodes in a particular layer may be connected to nodes in an immediately previous layer and nodes in an immediately next layer. In some implementations, skip connections may be used that connect one or more nodes between non-consecutive layers. A first layer of colorizer CNN 210 (referred to as input layer) may receive true grayscale images 202 and training grayscale images 210 (referred to jointly as input grayscale images) as input.

Further, true grayscale images 202 and groundtruth color images 206 may each depict one or more persons. During a training phase for colorizer CNN 210, groundtruth part annotations for each of the one or more persons may be provided as training input. The groundtruth part annotations can be generated automatically, e.g., using any suitable part segmentation technique, or manually, e.g., by human annotators. Since the generation of groundtruth part segmentation is independent of the color of the image, groundtruth part annotations can be generated for both true grayscale images (e.g., historical black and white photographs) and for training grayscale or color images (e.g., modern photographs).

CNN 210 may be trained to predict part annotations that match the groundtruth part annotations provided as training input. Thus, a trained colorizer CNN 210 generates a network output image that includes both color values predicted for pixels of an input image and part annotations for one or more persons depicted in the input image.

Colorizer CNN 210 is trained to analyze input grayscale images to detect one or more features of the input grayscale images. Specifically, colorizer CNN 210 may perform part segmentation to detect one or more parts of a human person depicted in the input grayscale images. In some implementations, the one or more parts that are detected may include face, torso, right arm, left arm, left leg, and right leg. In some implementations, the one or more parts that are detected may include face, torso, right upper arm, right lower arm, left upper arm, left lower arm, right hand, left hand, right upper leg, right lower leg, left upper leg, left lower leg, left foot, and right foot. Still other implementations may detect more parts or less parts.

In some implementations, detection of the one or more parts may include generating part annotations. For example, the part annotations may indicate whether a pixel of the image belongs to a particular part of a particular person, or whether the pixel is not part of a person depicted in the image. When a plurality of persons are depicted in an input image, the detection of parts may be performed such that parts are detected for each person depicted in the input image.

Colorizer CNN 210 is also trained to generate color (chroma) values for each pixel of an input image. The layers of colorizer CNN 210 may be arranged such that a feature vector corresponding to a colorized image is generated by multiple layers of colorizer CNN 210. For example, as shown in FIG. 2, a latent layer 212 and an output layer 214 may each generate a colorized image from an input grayscale image.

As illustrated in FIG. 2, the output of latent layer 212 may include intermediate colorized images 230. In some implementations, intermediate colorized images 230 may be output by latent layer 212 as intermediate feature vectors. In some implementations, an image resolution of intermediate colorized images 230 may be lower than that of input grayscale images.

Further, output layer 214 may generate network output images 232. In some implementations, a residual network may be used as output layer 214. Use of a residual network may speed up the training of colorizer CNN 210. In some implementations, an image resolution of network output images 232 may be of a same resolution as that of input grayscale images. In some implementations, network output images 232 may be output by output layer 214 as feature vectors.

While FIG. 2 illustrates a colorizer CNN, it will be understood that any other type of generating machine learning model, e.g., an autoencoder, a variational autoencoder, or other type of model, etc. can be used to colorize input grayscale images.

In some implementations, GAN configuration 200 may further include a feature discriminator 218. Feature discriminator 218 may be implemented using any type of machine learning model, e.g., a classifier neural network. A gradient reversal layer may be used in some implementations. For example, the gradient reversal layer may provide feedback from the feature discriminator to colorizer CNN 210, e.g., a loss value based on output of the feature discriminator. In some implementations, intermediate colorized images 230 are provided as input to feature discriminator 218.

Feature discriminator 218 may be trained to determine whether an input image, e.g., any of the intermediate colorized images, is an image for which a groundtruth color image is available. For example, feature discriminator 218 may analyze a feature vector of the input image to make such determination. Feature discriminator 218 may generate a label prediction 250 as its output. In some implementations, label prediction 250 may be a binary value indicating whether the input image has a corresponding groundtruth color image ("Yes") or not ("No"). In some implementations, label prediction 250 may be a likelihood that the input image has a corresponding groundtruth color image, e.g., a probability value between 0 and 1. In some implementations, label prediction 250 may be a Wasserstein Metric.

In some implementations, GAN configuration 200 may also include a resizer 220. Resizer 220 may receive intermediate colorized images 230 as input and generated resized intermediate images 234 as output. For example, resizer 220 may upsample intermediate colorized images from a low resolution to a higher resolution, e.g., a same resolution as that of groundtruth color images. Resizer 220 may be implemented using any type of image upscaling technique, including machine-learning techniques, image upscaling algorithms, etc.

In some implementations, GAN configuration 200 may include a combiner 216. Combiner 216 may receive network output images 232, output by output layer 214 of colorizer CNN 210, and resized intermediate images 234 as input, and may generate colorized images 236 as output. In some implementations, each of network output images 232, resized intermediate images 234, and colorized images 236 may be represented as corresponding feature vectors that represent the image (including pixel locations and color values) and part annotations.

In some implementations, GAN configuration 200 may further include a pixel discriminator 222. Pixel discriminator 222 may be implemented using any type of machine learning model, e.g., a classifier neural network. For example, pixel discriminator 222 may be implemented using a convolutional neural network that extract features from the colorized image and classify the feature as belonging to a true color image or predicted color image. An output convolution layer can be used that produces a one-dimensional output, e.g., a label prediction.

Pixel discriminator 222 may be implemented to have a smaller receptive field and may interpret image texture.

Image texture is similar both groundtruth color images (e.g., modern color photographs captured in color) and colorized images (e.g., generated from grayscale historical photographs). In some implementations, colorized images 236 and/or groundtruth color images 206 are provided as input to feature discriminator 218.

Pixel discriminator 222 may be trained to analyze an input image, e.g., any of colorized images 222 and/or groundtruth color images 206 to determine whether the image is a true color image, e.g., one of groundtruth color images 206, or a predicted color image, e.g., one of colorized images 222. For example, pixel discriminator 222 may analyze a feature vector of the input image to make such determination. Pixel discriminator 222 may generate a label prediction 260 as its output. In some implementations, label prediction 260 may be a binary value indicating whether the input image is a true color image ("Yes") or not ("No"). In some implementations, label prediction 260 may be a likelihood that the input image is a true color image, e.g., a probability value between 0 and 1.

GAN configuration 200 is utilized to train colorizer CNN 210 (generator network) by using feature discriminator 218 and pixel discriminator 220 as adversarial networks. One or more parameters of colorizer CNN 210 are adjusted based on label prediction 250 by feature discriminator 218 and label prediction 260 by pixel discriminator 222. For example, the one or more parameters may include a weight of one or more nodes of one or more layers of colorizer CNN 210 and/or a connection between one or more pairs of nodes of colorizer CNN 210. A feature loss value may be determined based on label prediction 250 and provided as training input to colorizer CNN 210. Further, a perceptual loss value may be determined by the pixel discriminator and provided as training input to colorizer CNN 210.

One goal for colorizer CNN 210 is to generate intermediate colorized images that cause feature discriminator 218 to fail, e.g., for label prediction 250 to be incorrect. Stated another way, a trained colorizer CNN 210 is configured to generate intermediate colorized images (intermediate feature vectors) from true grayscale input images that are indistinguishable by feature discriminator 218 from intermediate colorized images (intermediate feature vectors) from training grayscale image.

Another goal for colorizer CNN 210 is to generate network output images that, when combined with resized intermediate images, produce colorized images that cause pixel discriminator to fail, e.g., for label prediction 260 to be incorrect. Stated another way, a trained colorizer CNN 210 is configured to generate colorized images (feature vectors) from true grayscale input images that are indistinguishable by pixel discriminator 222 from groundtruth color images.

GAN configuration 200 is also utilized to train feature discriminator 218. During training, intermediate colorized images 230 from colorizer CNN 210 are provided as input to feature discriminator 218 and the accuracy of label prediction 250 is evaluated. For example, label prediction 250 is accurate if it indicates that groundtruth color is available for an intermediate colorized image only when the intermediate colorized image is generated from one of training grayscale images 204, or equivalently, indicates that groundtruth color is not available for an intermediate colorized image only when the intermediate colorized image is generated from one of true grayscale images 202.

GAN configuration 200 is also utilized to train pixel discriminator 222. During training, colorized images 236 from colorizer CNN 210 and groundtruth color images 206 are provided as input to pixel discriminator 222 and the accuracy of label prediction 260 is evaluated. For example, label prediction 260 is accurate for an input image if it indicates that the image color of the input image is real only when the input image is one of groundtruth color images 206, or equivalently, indicates that the image color is not real only when the input image is one of colorized images 236 generated by colorizer CNN 210.

In some implementations, GAN configuration 200 may include a saturation enhancer 224. Colorized images obtained from combiner 216 may be provided as input to saturation enhancer 224.

Saturation enhancer 224 may be configured to generate a saturation loss 260 that is used to train colorizer CNN 210. When colorizing grayscale images, one technical problem is that the resultant images often appear desaturated. Many users prefer images with a higher amount of saturation, e.g., modern images captured with a color film camera, digital camera, etc. Use of saturation loss 260 to train colorizer CNN 210 can ensure that colorized images produced by a trained colorizer CNN 210 have sufficient amount of saturation.

In some implementations, saturation enhancer 224 may be configured to compute saturation loss 260 such that low saturation in HSV (Hue, Saturation, Value) colorspace is penalized. Saturation loss 260 may be a heuristic loss that is used to train the colorizer CNN. Colorized images 236 generated by colorizer CNN 210 are provided as input to saturation enhancer 224. For example, colorized images 236 may be in sRGB format (Standard Red, Green, Blue) and include predicted color values for each pixel of a colorized image. Saturation enhancer 224 is configured to convert the pixel values to HSV colorspace using a RGB to HSV conversion function RGB_to_HSV, as illustrated in the formula below:

(hue,saturation,value)=RGB_to_HSV
(predicted_color)

In some implementations, saturation enhancer 224 may calculate saturation loss 260 from the "saturation" and "value" for each pixel of the colorized image (obtained using the formula above) by using the formula:

saturation loss=(1−saturation)×pow(value,weight)

where pow represents a power function, value is the base, and weight is the exponent. The pow function may apply a variable amount of penalty to different pixels, e.g., penalize dark pixels of the image less than bright pixels, based on the value.

In some implementations, value may represent a brightness of the colorized image. In some implementations, the weight may be set at 0.5. In some implementations, the weight may be adjusted based on the brightness of the value. The weight controls the sensitivity of the calculated saturation loss to the brightness of the value.

In some implementations, saturation enhancer 224 may calculate saturation loss 260 for a subset of pixels of a colorized image. For example, saturation loss 260 may be calculated only for background areas of the colorized image. In these implementations, part annotations generated by colorizer CNN 210 may be used to identify the background areas, e.g., an image mask that identifies foreground areas and background areas of the colorized image. For example, background areas may correspond to pixels of the colorized image that are not annotation as being a part of a person depicted in the image. Stated another way, pixels of the colorized image that are part of the depiction of a person in the image may be excluded when calculating saturation loss 260.

One or more parameters of colorizer CNN 210 are adjusted based on saturation loss 260 generated by saturation enhancer 224. For example, the one or more parameters may include a weight of one or more nodes of one or more layers of colorizer CNN 210 and/or a connection between one or more pairs of nodes of colorizer CNN 210.

In some implementations, GAN configuration 200 may include a skin tone enhancer 224. Colorized images obtained from combiner 216 may be provided as input to skin tone enhancer 226. A problem with a colorized image generated from grayscale images is that skin pixels in the colorized image is sometimes assigned a color that is not a range of values that correspond to human skin colors. For example, colorized images may sometimes include skin pixels that are purple in color or are not of warm skin tone. Such colorized images may be deemed unsatisfactory since the assigned colors for skin pixels are inaccurate.

In some implementations, skin tone enhancer 226 may be configured to compute skin tone loss 270 that is used to train colorizer CNN 210 to eliminate or reduce instances where a colorized image generated by colorizer CNN 210 has skin pixels with a wrong or unsuitable color. Skin tone loss 270 may be a heuristic loss that is used to train the colorizer CNN. In some implementations, a particular hue value, e.g., hue=20, may be set as a default skin tone value. Skin tone loss 270 is then computed based on this value.

First, colorized images 236 generated by colorizer CNN 210 may be converted to HSV colorspace, as described above with reference to saturation enhancer 224. Skin tone loss 270 may be calculated for each pixel of the colorized image using the formula:

$$\text{skin tone loss} = (\text{hue}-20)/20 \times \text{silhouette} \times \text{is\_gray}$$

where hue represents the hue of the pixel of the colorized image, silhouette is a binary value that indicates whether the pixel depicts a person, and is_gray indicates whether the source image for the colorized image was a training grayscale image (e.g., any of training grayscale images 204). Calculation of skin tone loss in this manner enables training the colorizer CNN 210 in a supervised way by comparison of the predicted color, e.g., color values of pixels as generated by the colorizer CNN 210, and groundtruth color values of the pixels, as obtained from a corresponding groundtruth color image from groundtruth color images 206.

The silhouette values may be obtained using part annotations generated by colorizer CNN 210. For example, pixels of the colorized image that are annotated as being part of a person (e.g., head, torso, arm, leg, etc.), may be identified as being within a silhouette (silhouette=1) and other pixels may be identified as being outside the silhouette (silhouette=0). Stated another way, pixels of the colorized image that are part of the depiction of a person in the image may be included and other pixels excluded when calculating skin tone loss 270.

One or more parameters of colorizer CNN 210 are adjusted based on skin tone loss 270 generated by skin tone enhancer 226. For example, the one or more parameters may include a weight of one or more nodes of one or more layers of colorizer CNN 210 and/or a connection between one or more pairs of nodes of colorizer CNN 210.

Example methods to train feature discriminator 218, pixel discriminator 222, and colorizer CNN 210 are described with reference to FIGS. 3, 4, and 5 respectively.

Figure 3:
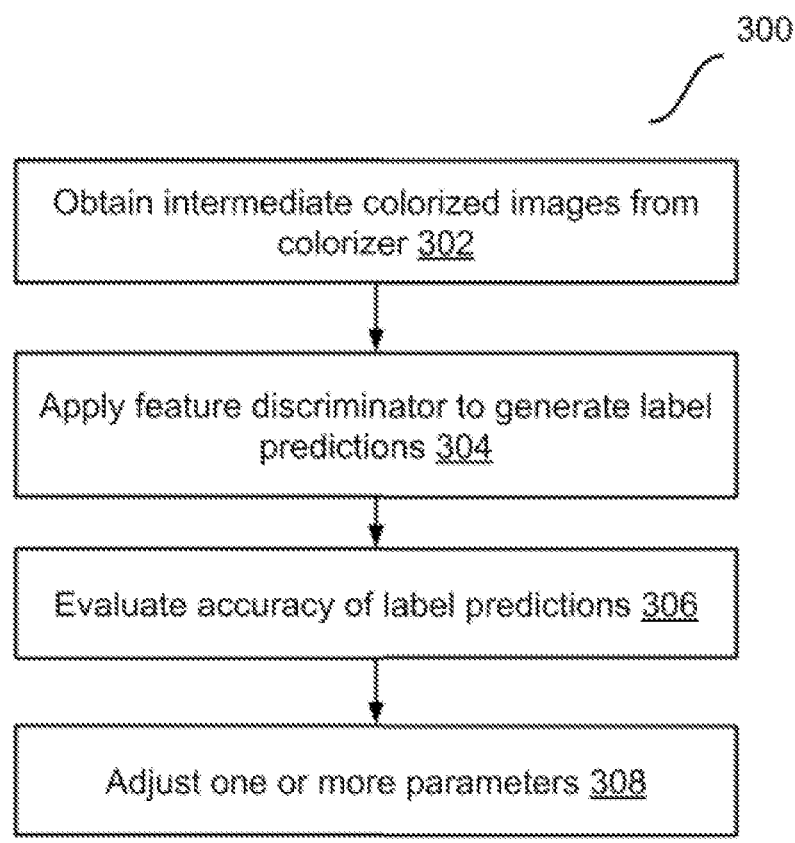
FIG. 3 is a flow diagram illustrating an example method to train a feature discriminator, according to some implementations.

FIG. 3 is a flow diagram illustrating an example method 300 to train a feature discriminator, e.g., feature discriminator 218, according to some implementations. In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., an accuracy of label prediction falling below a threshold, a predetermined time period having expired since the last performance of method 300, and/or one or more other conditions occurring which can be specified in settings read by the method.

Method 300 may begin at block 302. At block 302, colorized images, e.g., feature vectors that represent colorized images are obtained. For example, intermediate colorized images 230 may be obtained from colorizer CNN 210 and provided as input. Block 302 may be followed by block 304.

At block 304, the feature discriminator, e.g., feature discriminator 218, is applied to generate label predictions, e.g., label predictions 250. Block 304 may be followed by block 306.

At block 306, the label predictions are evaluated. For example, the accuracy of label prediction is determined for each intermediate colorized image, e.g., it is evaluated whether the feature discriminator successfully distinguished between intermediate colorized images for which groundtruth color is available, e.g., generated from training grayscale images 204, and intermediate colorized images for which groundtruth color is not available, e.g., generated from true grayscale images 202. A loss value is determined based on the accuracy of label predictions. Block 306 may be followed by block 308.

At block 308, the loss value is utilized to adjust one or more parameters of the feature discriminator. For example, when the feature discriminator is implemented using a neural network, the weight associated with one or more nodes of the neural network and/or a connection between one or more pairs of nodes of the neural network may be adjusted based on the loss value.

Method 300, or portions thereof, may be repeated any number of times using additional inputs. For example, method 300 may be repeated until a threshold level of label prediction accuracy is reached.

Figure 4:
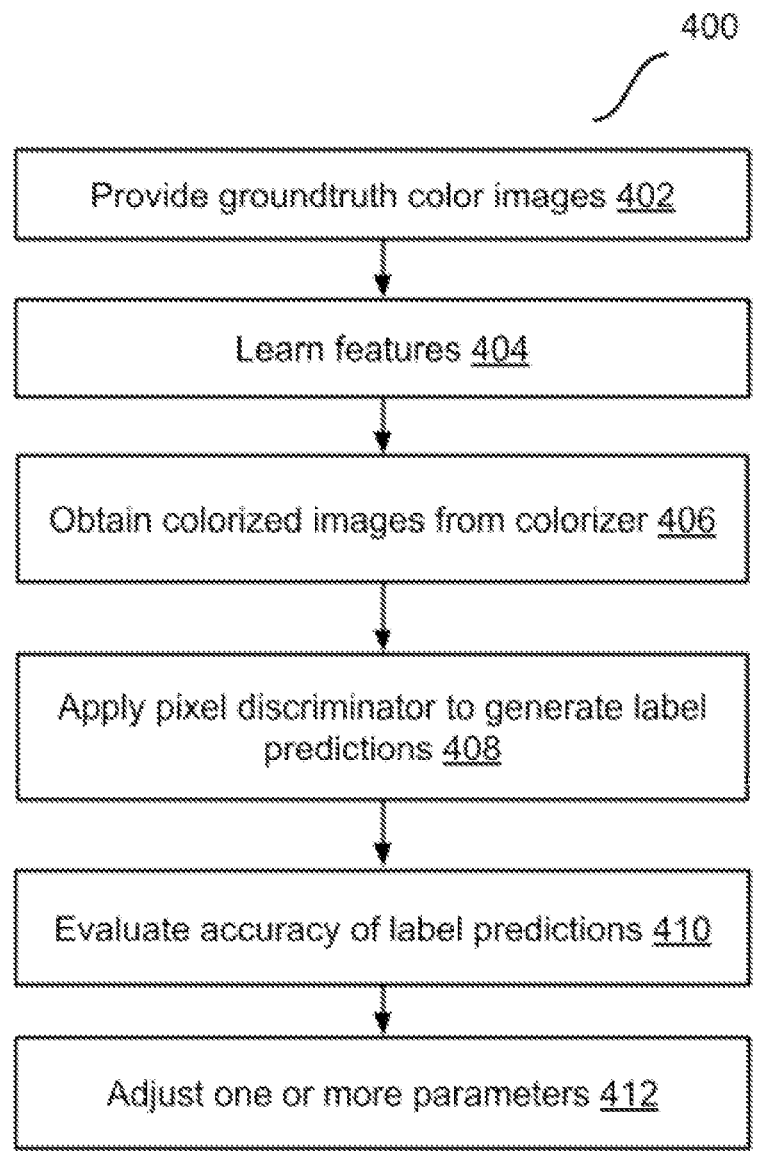
FIG. 4 is a flow diagram illustrating an example method to train a pixel discriminator, according to some implementations.

FIG. 4 is a flow diagram illustrating an example method 400 to train a pixel discriminator, e.g., pixel discriminator 222, according to some implementations. In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., an accuracy of label prediction falling below a threshold, a predetermined time period having expired since the last performance of method 400, and/or one or more other conditions occurring which can be specified in settings read by the method.

Method 400 may begin at block 402. At block 402, groundtruth color images are provided as input to a pixel discriminator, e.g., pixel discriminator 222. Block 402 may be followed by block 404.

At block 404, features of the groundtruth color images are learned. For example, pixel discriminator may learn an embedding, e.g., a set of numeric values, that represents a distribution or pattern determined from the groundtruth color images. Block 404 may be followed by block 406.

At block 406, colorized images are obtained. For example, additional images from groundtruth color images 206 and/or colorized images 236 generated by colorizer CNN 210 may be obtained. Block 406 may be followed by block 408.

At block 408, the pixel discriminator is applied to the colorized images to generate label predictions that indicate whether each image in the colorized images has a real color (e.g., the image is a groundtruth color image) or a predicted color (e.g., the image is an image that has been colorized). In some implementations, the colorized images provided as input may be sRGB (Standard Reg, Green, Blue) images, e.g., images that have three channels.

In some implementations, a heatmap based on one or more faces detected in the colorized image may be provided as input to the pixel discriminator. For example, the heatmap may be a single channel that indicates the pixels of the colorized image that are part of a human face (including or excluding upper body or other parts of the body). For example, the heatmap may be generated using a face detection technique and then generating a gaussian heatmap for each detected face in the colorized image. In some implementations, the pixel discriminator may generate a segmentation mask based on the colorized image (sRGB) and the heatmap. The segmentation mask may include one or persons depicted in the image, e.g., may distinguish human bodies (silhouettes) in the image from background areas of the image. Block 408 may be followed by block 410.

At block 410, the label predictions are evaluated. For example, the accuracy of label prediction is determined for each colorized image, e.g., it is evaluated whether the pixel discriminator successfully distinguished between colorized images (e.g., generated by colorizer CNN 210) and groundtruth color images (e.g., groundtruth color images 206). A loss value is determined based on the accuracy of label predictions. Block 410 may be followed by block 412.

At block 412, the loss value is utilized to adjust one or more parameters of the pixel discriminator. For example, when the pixel discriminator is implemented using a neural network, the weight associated with one or more nodes of the neural network and/or a connection between one or more pairs of nodes of the neural network may be adjusted based on the loss value.

In some implementations, one or more additional inputs may be provided to the pixel discriminator. For example, a feature vector generated based on the input grayscale image may be generated using an image classifier. In some implementations, the classifier may be a machine-learning classifier. In some implementations, the feature vector may be a set of numbers, e.g., floating point numbers, specific to the image. The feature vector for an image may be indicative of the similarity of the image to one or more other images. For example, the classifier may generate feature vectors (e.g., sets of numbers) such that images that are similar semantically and/or visually are assigned sets that are close to each other. The feature vector is therefore usable to identify images that are similar to the image.

Method 400, or portions thereof, may be repeated any number of times using additional inputs. For example, blocks 402 and 404 may be repeated with multiple sets of groundtruth color images. In another example, block 406-412 may be repeated with additional groundtruth images and/or additional colorized images. Method 400 may be repeated until a threshold level of label prediction accuracy is reached.

Figure 5:
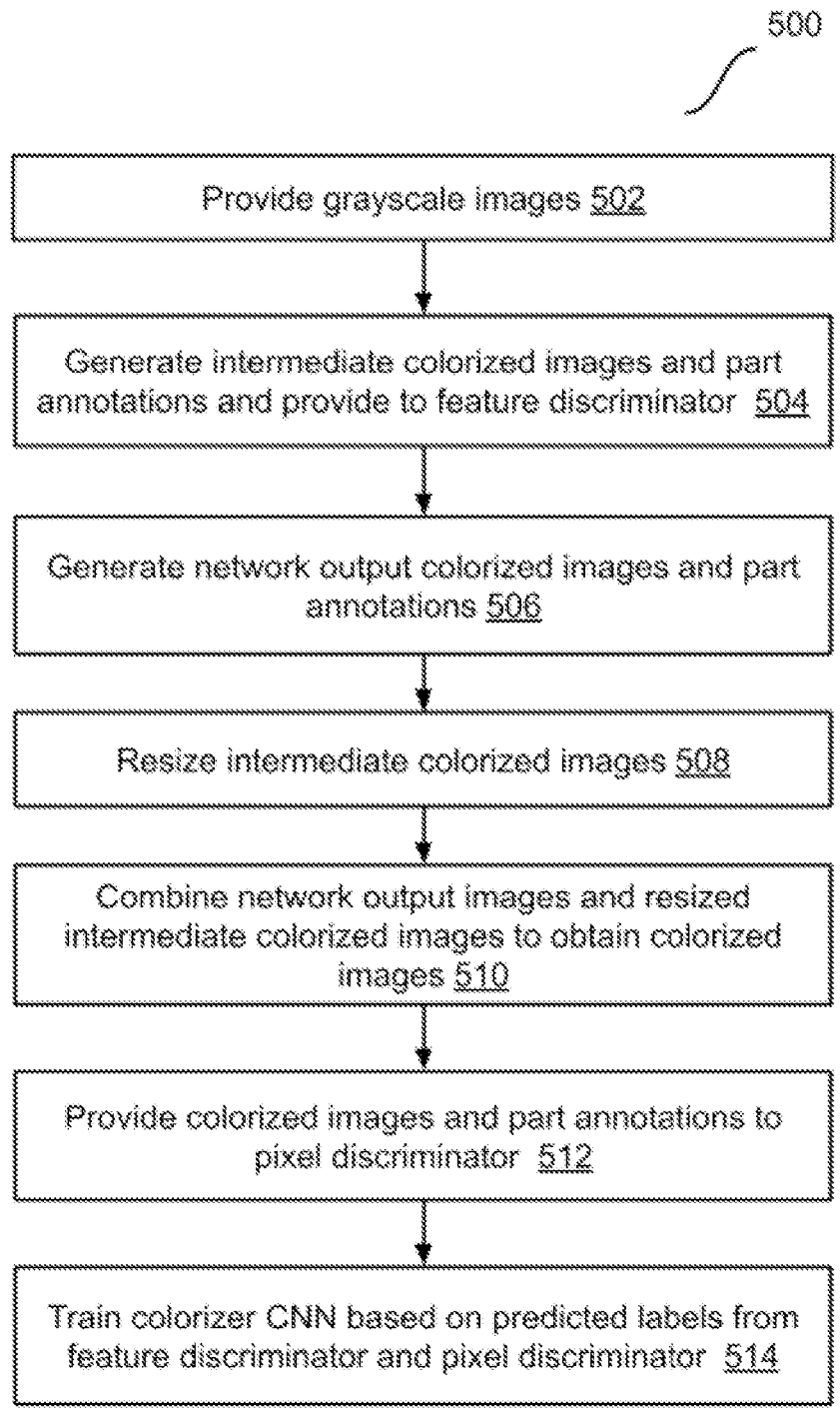
FIG. 5 is a flow diagram illustrating an example method to train a colorizer, according to some implementations.

FIG. 5 is a flow diagram illustrating an example method 500 to train a colorizer, e.g., colorizer CNN 210, according to some implementations. In some implementations, method 500 can be implemented, for example, on a server system 102 as shown in FIG. 1. In some implementations, some or all of the method 500 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., an accuracy of label prediction falling below a threshold, a predetermined time period having expired since the last performance of method 500, and/or one or more other conditions occurring which can be specified in settings read by the method.

Method 500 may begin at block 502. At block 502, grayscale images are provided as input to a colorizer, e.g., colorizer CNN 210. The grayscale images may include true grayscale images 202 and/or training grayscale images 204. The grayscale images may include images that depict one or more persons. Block 502 may be followed by block 504.

At block 504, intermediate colorized images and corresponding part annotations are generated. In some implementations, the intermediate colorized images and corresponding part annotations may be represented by an intermediate feature vector generated by a latent layer, e.g., latent layer 212 of colorizer CNN 210. The part annotations may indicate part segmentation of one or more persons depicted in the grayscale images, e.g., classify each pixel of an input image as not depicting a person, or depicting a particular part of a person, e.g., head, torso, arm, leg, etc. The intermediate feature vector is provided as input to a feature discriminator, e.g., feature discriminator 218. Block 504 may be followed by block 506.

At block 506, network output colorized images and corresponding part annotations are generated. In some implementations, the network output colorized images and corresponding part annotations may be represented by a feature vector generated by an output layer, e.g., output layer 214 of colorizer CNN 210. Block 506 may be followed by block 508.

At block 508, intermediate colorized images generated at block 506 are resized. For example, intermediate colorized images generated at block 506 may be upsampled (or upconverted) to obtain resized intermediate colorized images that have the same resolution as network output images generated at block 508. In some implementations, the resolution of resized intermediate colorized images and network output images may be same as that of groundtruth color images. Block 508 may be followed by block 510.

At block 510, resized intermediate colorized images and network output images are combined to obtain colorized images. Block 510 may be followed by block 512.

At block 512, colorized images obtained in block 510 and corresponding part annotations are provided as input to a pixel discriminator, e.g., pixel discriminator 222. Block 512 may be followed by block 514.

At block 514, label predictions from feature discriminator and pixel discriminator are obtained. In some implementations, respective loss values may be obtained from the feature discriminator and the pixel discriminator based on the respective label predictions. For example, a feature loss value may be obtained from the feature discriminator and a perceptual loss value may be obtained from the pixel discriminator.

A gradient reversal layer may be used in some implementations. For example, the gradient reversal layer may provide feedback from the feature discriminator to colorizer CNN 210. In some implementations, the loss value output by the feature discriminator may be provided to colorizer CNN via the gradient reversal layer.

In some implementations, the perceptual loss value may be based on a difference between groundtruth color images and corresponding colorized images generated by the colorizer CNN 210. The perceptual loss may be obtained using a trained neural network that determines the perceptual loss based on comparisons of pairs of images. In some implementations, e.g., when the pixel discriminator is implemented using a multi-layer neural network, the output layer of the pixel discriminator may generate the perceptual loss value as an L2 loss between a groundtruth image and a corresponding colorized image produced by the colorizer CNN 210. In some implementations, the pixel discriminator may generate the label prediction based on the perceptual loss value.

The label predictions or loss values are utilized to train the colorizer, e.g., colorizer CNN 210. In some implementations, the loss values may be L1 loss values. For example, when the colorizer is implemented as a ladder CNN k, the weight associated with one or more nodes of the neural network and/or a connection between one or more pairs of nodes or layers of the neural network may be adjusted based on the loss values.

In some implementations, back-propagation, e.g., from network output images 232 and/or colorized images 236 may be sent directly to latent layer 212. Such back-propagation can speed up the training of colorizer CNN 210.

Method 500, or portions thereof, may be repeated any number of times, e.g., till the colorizer being trained generates colorized images that cause label predictions by the feature discriminator and/or the pixel discriminator to meet a threshold level of inaccuracy.

A trained colorizer is thus obtained using method 500 that can take as input a grayscale image and generate as output a colorized image that adds color (chroma) to the grayscale image and part annotations for one or more persons depicted in the grayscale image. Use of the feature discriminator for training can ensure that the colorized image generated by the trained colorizer has a structure that is similar to groundtruth color images. Use of the feature discriminator that takes as input the output of a latent layer of the colorizer can ensure that the colorizer generates similar feature vectors both for true grayscale images and for training grayscale images. For example, true grayscale images may include historical black and white photographs for which no color data is available. Further, the use of the pixel discriminator for training can ensure that the colorized image generated by the trained colorizer has a texture that is similar to groundtruth color images.

A colorizer CNN 210 trained using method 500 as described above may be provided a trained machine learning model that can be utilized to colorize images. Thus, the trained colorizer CNN 210 may be provided, without other blocks described with reference to FIG. 2, e.g., combiner 216, feature discriminator 218, resizer 220, and/or pixel discriminator 222. For example, trained colorizer CNN 210 may be provided so that image colorization can be performed on any device. For example, trained colorizer CNN 210 may be provided on any of client devices 120-126 as part of image application 156a, as part of other applications 154, as part of an operating system of the client devices 120-126.

In some implementations, e.g., when on-device training (or retraining) of the colorizer CNN 210 is performed, one or more additional blocks of GAN configuration 200, or the entirety of GAN configuration 200 may be provided on the device. For example, a server device 104 may implement GAN configuration 200 in image application 156b and/or model training application 158.

Figure 6:
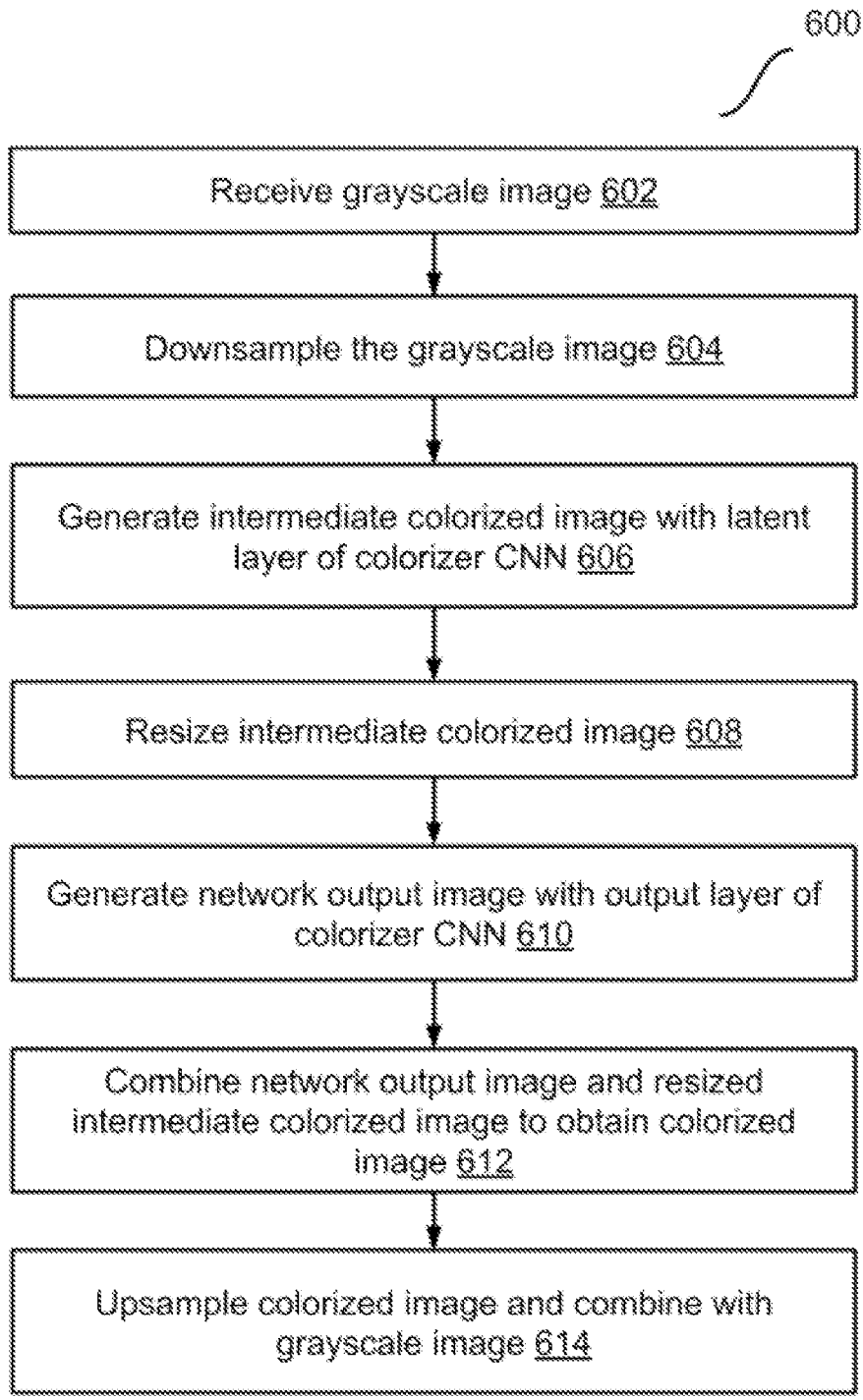
FIG. 6 is a flow diagram illustrating an example method to colorize an image using a trained convolutional neural network, according to some implementations.

FIG. 6 is a flow diagram illustrating an example method 600 to colorize an image using a trained convolutional neural network, according to some implementations. For example, the trained convolutional neural network may be colorizer CNN 210, obtained after training using the techniques described above with reference to FIG. 5.

In some implementations, method 600 can be implemented, for example, on a server system 102 as shown in FIG. 1. In some implementations, some or all of the method 600 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., an accuracy of label prediction falling below a threshold, a predetermined time period having expired since the last performance of method 400, and/or one or more other conditions occurring which can be specified in settings read by the method.

Method 600 may begin at block 602. At block 602, a grayscale image is received. For example, the grayscale image may be an old black and white photograph, e.g., a scanned photograph, that depicts one or more persons. For example, the grayscale image may be received as user input, e.g., when a user activates an image colorization feature of a software application, e.g., by selecting a user interface option displayed on a user interface. For example, the user may activate the user interface option by clicking or tapping on the user interface, by voice command, etc.

In another example, e.g., where colorization feature is provided via an application programming interface (API) or otherwise provided as a service, the grayscale image may be received via a program call to the API, upload to the image colorization service, etc. The API may be provided, e.g., as an operating system API for a smartphone, a digital camera, a tablet, or any other device that has an image capture capability. The API may be utilized, e.g., by applications that execute on the device to make requests to colorize images.

In some implementations, the grayscale image may be an image captured using a digital camera. For example, a digital camera may capture a grayscale image when the scene being captured is dark. Such capture may be performed, e.g., by illuminating the scene with infrared light and capturing an image with an infrared-enabled sensor. In such type of capture, the person activating the camera and the persons in the scene do not see the illuminating light since it is outside the visible light range (infrared), but an infrared-capable imaging sensor of the digital camera can capture a black and white photograph. For example, the digital camera may be a smartphone camera. In another example, the digital camera may be a security camera that has an infrared emitter and infrared-enabled sensor.

While the foregoing description refers to specific examples of grayscale images, it will be understood that any grayscale image, e.g., a digital image that has no chroma or color information, can be utilized. Block 602 may be followed by block 604.

At block 604, the grayscale image is downsampled. Downsampling the grayscale image may include reducing the image resolution. For example, the image resolution may be changed to 256×256 pixels, 352×352 pixels, or other suitable resolution, while the received grayscale image may be of a higher resolution, e.g., 1024×1024 pixels, 2048× 2048 pixels, or any other resolution. Downsampling the image can reduce the computational complexity of colorizing the image, e.g., colorizing the downsampled image may require lower processor resources, lower memory, etc. Reduction in computational load may also enable colorization to be performed on devices with relatively low computational capacity, e.g., smartphones, tablets, digital cameras, etc. In some implementations, the target resolution that is achieved after downsampling may be selected based on a configuration of a colorizer convolutional neural network (e.g., colorizer CNN 210) that is used to colorize the image. Block 604 may be followed by block 606.

At block 606, an intermediate colorized image based on the grayscale image is obtained from a latent layer of a colorizer CNN, e.g., colorizer CNN 210 that has been trained to colorize grayscale images, e.g., as described above with reference to FIG. 5. In some implementations, a resolution of the intermediate colorized image may be lower than that of the input grayscale image or downsampled grayscale image. For example, the intermediate colorized image may have a resolution of 16×16 pixels, 32×32 pixels, 64×64 pixels, etc. In some implementations, the resolution of the intermediate colorized image may be based on the particular latent layer of the colorizer CNN from which the intermediate colorized image is obtained. Block 606 may be followed by block 608.

At block 608, the intermediate colorized image is resized. For example, the intermediate colorized image may be resized (upsampled) to a same resolution as the grayscale image, or the downsampled grayscale image. Block 608 may be followed by block 610.

At block 610, a network output image based on the grayscale image is obtained from an output layer of a colorizer CNN, e.g., colorizer CNN 210. In some implementations, a resolution of the network output image may be the same as the grayscale image or the downsampled grayscale image. Block 610 may be followed by block 612.

At block 612, the resized intermediate colorized image and the network output image are combined to obtain a colorized image. Block 612 may be followed by block 614.

At block 614, the colorized image is upsampled. For example, the colorized image may be upsampled to a same size as the grayscale image. Further, the colorized image is combined with the grayscale image, e.g., the grayscale image or the downsampled grayscale image. An output image obtained as a result of the combination. The output image may have a same resolution as that of the grayscale image received in block 602.

Method 600 can be used to colorize any grayscale image. For example, method 600 can be used to colorize a grayscale image that depicts one or more person. For example, method 600 can be used to colorize a black-and-white photograph, e.g., a photograph captured using a camera that has been digitized. In some implementations, a user interface may be displayed that includes the output image. In some implementations, the user interface may enable a user to view and edit the output image, e.g., adjust saturation, brightness, white balance, etc. In some implementations, the user interface may show the output image and the input grayscale image, e.g., side-by-side, or in other configurations. In some implementations, the user interface may include an option that enables a user to toggle display of the output image and the input grayscale image; save the output image to storage; print the output image; upload the output image to an image library or image sharing service; send the output image to other users via a messaging application; etc.

Method 600 may be repeated for any number of grayscale images. In some implementations, one or more blocks of method 600 may be omitted, or combined with other blocks. For example, in some implementations, block 604 may be omitted, e.g., when the colorizer CNN can process the grayscale image directly (e.g., when method 600 is implemented on a computing device with high computational capacity, e.g., a server; when the colorizer CNN can accept a high resolution input; etc.). In some implementations, block 614 may be performed to combine the colorized image and the grayscale image without upsampling the colorized image first, e.g., when the colorized image generated by the colorizer CNN is of same or similar resolution as the grayscale image.

In some implementations, trained models, e.g., colorizer CNN 210, feature discriminator 218, or pixel discriminator 222 may be updated, e.g., based on the use of additional training data. The additional training may help improve accuracy and/or speed of the model. In some implementations, e.g., when users provide consent to use of user data to update trained models, a trained model may be updated locally, e.g., on a particular client device, based on user activity or response. For example, such user data may include one or more images, e.g., color images or grayscale images. In these implementations, user data is not transmitted or shared. Further, if the user provides consent, updates to trained models may be provided over network 130, e.g., to server device 104 or one or more other client devices.

In some implementations, a trained model may be customized based on a device (e.g., client device 120-124). For example, different client devices may have different processing capabilities based on the available hardware, e.g., a single-core processor, a multi-core processor, one or more parallel processors, a graphics processor with a number of graphics processing units (GPUs), a reconfigurable processor (e.g., FPGA), a neural network processor, etc. Further, different client devices may have different availability levels of other resources such as memory, battery capacity, network bandwidth, etc.

For example, a trained model with relatively higher complexity may be provided in a device (e.g., any of client device 120-124, or server device 104) that has a neural network processor or a GPU that is optimized for parallel processing, e.g., that the inference engine utilizes. In this example, greater processing capabilities of a client device are utilized to implement a trained model.

In another example, a simplified trained model (e.g., with fewer neural network nodes or layers) may be provided in a client device that has greater resource constraints, e.g., a single-core processor with limited capabilities. In some implementations, multiple trained models may be provided on a client device. At the time of invocation, e.g., to colorize an image, applying the local classifier, an appropriate trained model may be utilized, e.g., based on contextual factors such as network connectivity, battery capacity available, memory available, etc.

One problem when automatically colorizing a grayscale image is that it is difficult to achieve correct white balance in the generated output image. The implementations described herein can colorize images with appropriate white balance. A colorizer convolutional neural network that has been trained with groundtruth color images can generate a colorized image that has pixel values with appropriate white balance.

Another problem when automatically colorizing a grayscale image is to ensure that the colorized image has suitable and diverse colors. For example, if the grayscale image is a black and white photograph that depicts multiple persons, it is useful to not have the different persons depicted in similar colors, e.g., all wearing clothing that has similar color shades. The described techniques can produce a diversity of colors by ensuring that there is no 1:1 match between the pixel values of the input gray pixels and the values of pixels of the colorized image.

Yet another problem occurs when the grayscale image is an old image that depicts one or more persons, e.g., captured in an earlier era, captures subjects from a different culture, etc. In such situations, groundtruth training images that are from a similar era or culture may be unavailable. Machine learning models that are trained with modern photographs or photographs from a different culture can fail to adapt to such images. Persons in prior eras typically wore different clothing styles and different color shades than those in modern photos. Lacking sufficient number of training images from such eras, various types of errors may occur in the colorized images generated by such machine learning models. For example, errors such as inconsistent coloring of skin regions, e.g., face region being colored differently than hands; skin areas being assigned the same color as clothing; etc. can occur. This can be referred to as a domain adaptation problem.

Some implementations described herein address these technical problems and can produce colorized images with good white balance and color diversity, and can adapt to different domains of input images. Specifically, training a machine learning model to perform both part segmentation and colorization, as described herein, can provide a trained model that overcomes the described problems. Further, implementations described herein use a generative adversarial network (GAN) configuration that includes two adversarial discriminator networks that generate different label predictions and/or loss values. Training a machine learning model with the two loss values can ensure that the machine learning model is robust to different types of grayscale input images and generates colorized images based on both image structure and image texture.

Use of a machine learning model that is trained to perform both part segmentation and image colorization has several technical benefits. For example, the part segmentation information generated by the trained model identifies portions of the input image that correspond to clothing worn by one or more persons depicted in the input image and the model generates colors for the clothing based on color images that are used to train the model.

Another benefit is that the trained model can more accurately identify skin regions based on the part annotations which can ensure that all skin regions of persons depicted in the input image are colorized. Use of the skin tone loss can ensure that the skin regions do not have colors that are not skin colors.

Still further, use of saturation loss can generate output images that have a good amount of saturation. Further, in some implementations, use of utilize saturation loss can be restricted to regions that do not correspond to a person, e.g., regions of the input image that are not identified in the part annotations. Restricting the use of saturation loss in this manner can prevent oversaturated color on skin regions of persons depicted in the input image.

While the foregoing description refers to a colorizer CNN that performs part segmentation and colorization, other models can also be trained to colorize images that depict a person. For example, a model may be trained to detect a pose of a person depicted in the image and to perform colorization. Pose detection may include, e.g., detecting a plurality of keypoints of a person. For example, keypoints may include image pixels that correspond to one or more of head, shoulders, elbows, wrists, hips, knees, and ankles of a person depicted in the image. Pose detection may also include detecting connections between these points, e.g., skeletal connections.

Further, when different datasets have different distributions, e.g., the frequency of depiction of persons wearing certain types of headgear, e.g., caps, a dataset classifier can be used during training to ensure that a colorizer CNN that generates colorized images does not color images based on a particular feature of input datasets, or doesn't learn features from a training dataset that do not occur in the input images. For example, a discriminator (e.g., pixel discriminator) may receive a dataset type as input and can utilize it to penalize the generative model by generating training feedback that reduces the likelihood that the generative model learns such features.

Further, as an alternative to, or in addition to perceptual loss value, a neighborhood color loss or chroma loss can be calculated for one or more pixels of the colorized image based on a per pixel computation of mean square error. For example, for each pixel for which the neighborhood color loss is calculated, a mask can be created to identify other pixels of the image, e.g., neighboring pixels, that have similar pixel color. The mask can be created both for a colorized image generated by a colorizer CNN and for a groundtruth color image. The mean square error of the respective masks can be compared to obtain the neighborhood color loss. The neighborhood color loss can be provided as feedback to the colorizer CNN and can ensure that colorized images output by the colorizer CNN have suitable white balance and color diversity.

Figure 7:
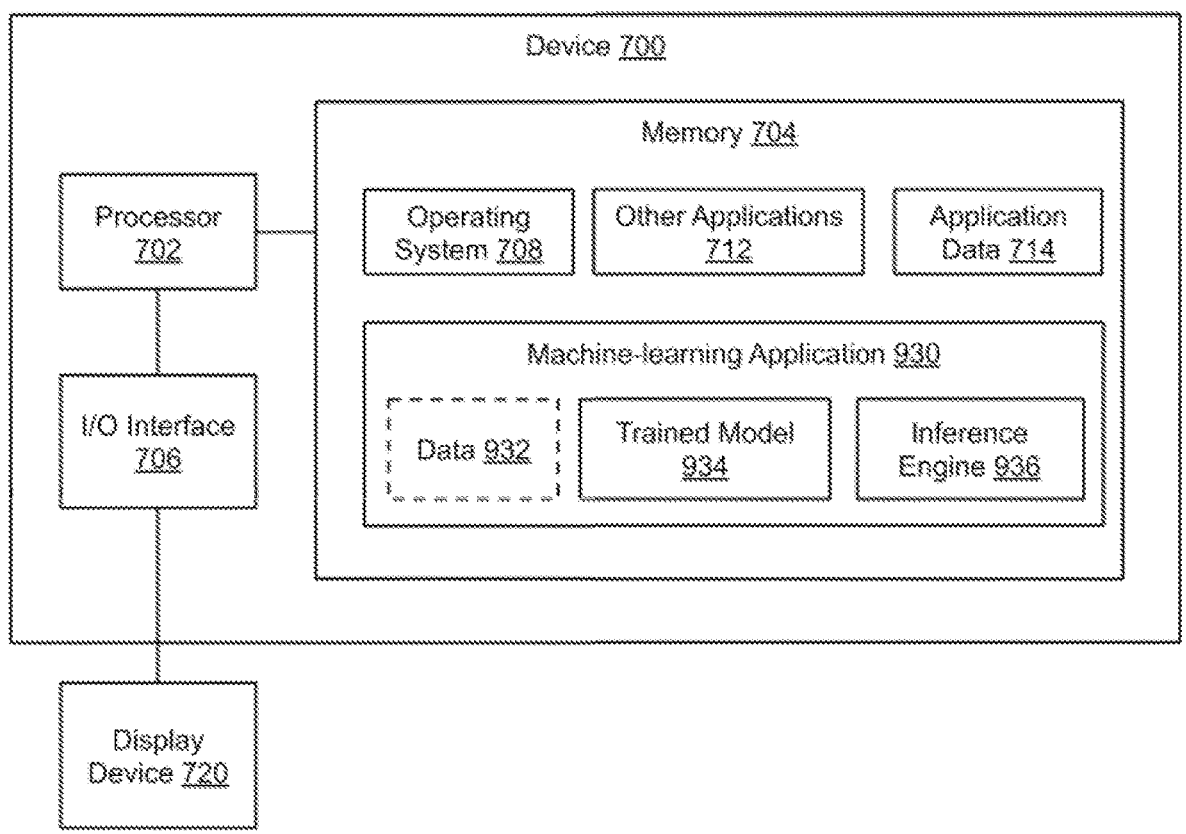
FIG. 7 is a block diagram of an example device which may be used for one or more implementations described herein.

FIG. 7 is a block diagram of an example device 700 which may be used to implement one or more features described herein. In one example, device 700 may be used to implement a client device, e.g., any of client devices 115 shown in FIG. 1. Alternatively, device 700 can implement a server device, e.g., server 101. In some implementations, device 700 may be used to implement a client device, a server device, or both client and server devices. Device 700 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 700 includes a processor 702, a memory 704, and input/output (I/O) interface 706. Processor 702 can be one or more processors and/or processing circuits to execute program code and control basic operations of the device 700. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 702 may include one or more co-processors that implement neural-network processing. In some implementations, processor 702 may be a processor that processes data to produce probabilistic output, e.g., the output produced by processor 702 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, machine-learning application 730, other applications 712, and application data 714. Other applications 712 may include applications such as a data display engine, web hosting engine, image display engine, notification engine, social networking engine, etc. In some implementations, the machine-learning application 730 and other applications 712 can each include instructions that enable processor 702 to perform functions described herein, e.g., some or all of the methods of FIGS. 2, 3, 4, and 7.

Other applications 712 can include, e.g., image editing applications, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application may utilize Bayesian classifiers, support vector machines, neural networks, or other learning techniques. In some implementations, machine-learning application 730 may include a trained model 734, an inference engine 736, and data 732. In some implementations, data 732 may include training data, e.g., data used to generate trained model 734. For example, training data may include any type of data such as text, images, audio, video, etc. When trained model 734 is a colorizer, e.g., a colorizer CNN 210, or other type of colorizer model, training data may include groundtruth color images 206.

Training data may be obtained from any source, e.g., a data repository specifically marked for training, data for which permission is provided for use as training data for machine-learning, etc. In implementations where one or more users permit use of their respective user data to train a machine-learning model, e.g., trained model 734, training data may include such user data. In implementations where users permit use of their respective user data, data 732 may include permitted data such as images (e.g., photos or other user-generated images).

In some implementations, training data may include synthetic data generated for the purpose of training, such as data that is not based on user input or activity in the context that is being trained, e.g., data generated from simulated photographs or other computer-generated images. In some implementations, machine-learning application 730 excludes data 732. For example, in these implementations, the trained model 734 may be generated, e.g., on a different device, and be provided as part of machine-learning application 730. In various implementations, the trained model 734 may be provided as a data file that includes a model structure or form, and associated weights. Inference engine 736 may read the data file for trained model 734 and implement a neural network with node connectivity, layers, and weights based on the model structure or form specified in trained model 734.

In some implementations, the trained model 734 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, the nodes of a first layer (e.g., input layer) may receive data as input data 732 or application data 714. For example, when trained model 734 is a colorizer, the input data may include grayscale images, e.g., true grayscale images 202 and/or training grayscale images 204. Such data can include, for example, one or more pixels per node, e.g., when the trained model is used for image analysis or image generation. Subsequent intermediate layers may receive as input output of nodes of a previous layer per the connectivity specified in the model form or structure. These layers may also be referred to as hidden layers or latent layers.

A final layer (e.g., output layer) produces an output of the machine-learning application. For example, the output may be a colorized image with part annotations that identify one or more parts of a person depicted in the image. In some implementations, model form or structure also specifies a number and/or type of nodes in each layer.

In different implementations, trained model 734 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 734 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 732, to produce a result.

For example, training may include applying supervised learning techniques. In supervised learning, the training data can include a plurality of inputs (e.g., a set of grayscale images) and a corresponding expected output for each input (e.g., a set of groundtruth images corresponding to the grayscale images or other color images). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes colorized images, e.g., generated using a colorizer from input grayscale images, from groundtruth color images, e.g., color photos. Feature discriminator 218 and/or pixel discriminator 222 may be trained to differentiate data, as described above with reference to FIGS. 2, 3, and 4.

In some implementations, unsupervised learning may be used to produce knowledge representations, e.g., that may be used by machine-learning application 730. For example, unsupervised learning may be used to produce embeddings that are utilized by pixel discriminator 222, as described above with reference to FIGS. 2 and 4. In various implementations, a trained model includes a set of weights, or embeddings, corresponding to the model structure. In implementations where data 732 is omitted, machine-learning application 730 may include trained model 734 that is based on prior training, e.g., by a developer of the machine-learning application 730, by a third-party, etc. In some implementations, trained model 734 may include a set of weights that are fixed, e.g., downloaded from a server that provides the weights.

Machine-learning application 730 also includes an inference engine 736. Inference engine 736 is configured to apply the trained model 734 to data, such as application data 714, to provide an inference. In some implementations, inference engine 736 may include software code to be executed by processor 702. In some implementations, inference engine 736 may specify circuit configuration (e.g., for a programmable processor, for a field programmable gate array (FPGA), etc.) enabling processor 702 to apply the trained model. In some implementations, inference engine 736 may include software instructions, hardware instructions, or a combination. In some implementations, inference engine 736 may offer an application programming interface (API) that can be used by operating system 708 and/or other applications 712 to invoke inference engine 736, e.g., to apply trained model 734 to application data 714 to generate an inference. For example, the inference for a colorizer model may be a colorized image, while inferences for a feature discriminator or a pixel discriminator may be label predictions, as described above with reference to FIGS. 2-5.

Machine-learning application 730 may provide several technical advantages. For example, when trained model 734 is generated based on unsupervised learning, trained model 734 can be applied by inference engine 736 to produce knowledge representations (e.g., numeric representations) from input data, e.g., application data 714. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, a colorized image from a grayscale image, etc.).

In some implementations, such representations may be provided as input to a different machine-learning application that produces output from the output of inference engine 736. In some implementations, knowledge representations generated by machine-learning application 730 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 730 may be implemented in an offline manner. In these implementations, trained model 734 may be generated in a first stage, and provided as part of machine-learning application 730. In some implementations, machine-learning application 730 may be implemented in an online manner. For example, in such implementations, an application that invokes machine-learning application 730 (e.g., operating system 708, one or more of other applications 712) may utilize an inference produced by machine-learning application 730, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 734, e.g., to update embeddings for trained model 734.

In some implementations, machine-learning application 730 may be implemented in a manner that can adapt to particular configuration of device 700 on which the machine-learning application 730 is executed. For example, machine-learning application 730 may determine a computational graph that utilizes available computational resources, e.g., processor 702. For example, if machine-learning application 730 is implemented as a distributed application on multiple devices, machine-learning application 730 may determine computations to be carried out on individual devices in a manner that optimizes computation. In another example, machine-learning application 730 may determine that processor 702 includes a GPU with a particular number of GPU cores (e.g., 1000) and implement the inference engine accordingly (e.g., as 1000 individual processes or threads).

In some implementations, machine-learning application 730 may implement an ensemble of trained models. For example, trained model 734 may include a plurality of trained models that are each applicable to same input data. In these implementations, machine-learning application 730 may choose a particular trained model, e.g., based on available computational resources, success rate with prior inferences, etc. In some implementations, machine-learning application 730 may execute inference engine 736 such that a plurality of trained models is applied. In these implementations, machine-learning application 730 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 708 or one or more applications 712.

In different implementations, machine-learning application 730 can produce different types of outputs. For example, machine-learning application 730 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., colorized or otherwise stylized images generated by the machine-learning application in response to input images, e.g., grayscale images), audio or video (e.g., in response an input video, machine-learning application 730 may produce an output video with a particular effect applied, e.g., rendered in a comic-book or particular artist's style, when trained model 734 is trained using training data from the comic book or particular artist, etc. In some implementations, machine-learning application 730 may produce an output based on a format specified by an invoking application, e.g. operating system 708 or one or more applications 712. In some implementations, an invoking application may be another machine-learning application. For example, such configurations may be used in generative adversarial networks, where an invoking machine-learning application is trained using output from machine-learning application 730 and vice-versa.

Any of software in memory 704 can alternatively be stored on any other suitable storage location or computer-readable medium. In addition, memory 704 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. Interfaced devices can be included as part of the device 700 or can be separate and communicate with the device 700. For example, network communication devices, storage devices (e.g., memory and/or database 106), and input/output devices can communicate via I/O interface 706. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 706 can include one or more display devices 720 that can be used to display content, e.g., images, video, and/or a user interface of an output application as described herein. Display device 720 can be connected to device 700 via local connections (e.g., display bus) and/or via networked connections and can be any suitable display device. Display device 720 can include any suitable display device such as an LCD, LED, or plasma display screen, CRT, television, monitor, touchscreen, 3-D display screen, or other visual display device. For example, display device 720 can be a flat display screen provided on a mobile device, multiple display screens provided in a goggles or headset device, or a monitor screen for a computer device.

The I/O interface 706 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 7 shows one block for each of processor 702, memory 704, I/O interface 706, and software blocks 708, 712, and 730. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While some components are described as performing blocks and operations as described in some implementations herein, any suitable component or combination of components of environment 100, device 700, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to colorize a grayscale image that depicts a person, the method comprising:
receiving the grayscale image; and
generating a colorized image based on the grayscale image as output of a trained convolutional neural network (CNN) by providing the grayscale image as input to the trained CNN, wherein the trained CNN performs part segmentation to detect part annotations corresponding to one or more body parts of the person and colorizes the grayscale image using the part annotations.

2. The computer-implemented method of claim 1, wherein generating the colorized image comprises:
   obtaining an intermediate colorized image as output of a latent layer of the trained CNN;
   obtaining a network output image as output of an output layer of the trained CNN; and
   combining the intermediate colorized image and the network output image to obtain the colorized image.

3. The computer-implemented method of claim 2, wherein the intermediate colorized image has a lower resolution than the network output image, the method further comprising, prior to the combining, upsampling the intermediate colorized image to a same resolution as the network output image.

4. The computer-implemented method of claim 1, further comprising downsampling the grayscale image prior to providing the grayscale image as input to the trained CNN.

5. The computer-implemented method of claim 1, wherein the colorized image has a lower resolution than the grayscale image, the method further comprising:
   upsampling the colorized image to a same resolution as the grayscale image; and
   combining the colorized image with the grayscale image to obtain an output image.

6. The computer-implemented method of claim 1, wherein the trained CNN is trained in a generative adversarial network (GAN) configuration that comprises a feature discriminator and a pixel discriminator.

* * * * *